United States Patent

Patel

[15] 3,638,203

[45] Jan. 25, 1972

[54] RANDOM ACCESS SOLID-STATE MEMORY USING SCR'S

[72] Inventor: Arvindkumar M. Patel, Wappinger Falls, N.Y.

[73] Assignee: International Business Machines Corporation, Armonk, N.Y.

[22] Filed: July 30, 1969

[21] Appl. No.: 846,123

[52] U.S. Cl. ............ 340/173, 307/238

[51] Int. Cl. ............ G11c 7/00, G11c 11/34

[58] Field of Search ............ 340/173; 307/238, 284, 305

[56] References Cited

UNITED STATES PATENTS 2,966,599 12/1960 Haas ............ 307/206

3,011,155 11/1961 Dunlap ............ 340/173

3,021,436 2/1962 Jones ............ 307/293

*Primary Examiner*—Terrell W. Fears

*Assistant Examiner*—Stuart N. Hecker

*Attorney*—Hanifin and Jancin and Homer L. Knearl

[57] ABSTRACT

A memory array comparable to a core memory may be built up by use of a low-power silicon-control rectifier as the bistable element in each memory cell. In the preferred embodiment the gate of the low-power SCR is not used, and the four-layer device is referred to as a trigger diode. The trigger diode is driven into a high-conductance state by exceeding the breakover voltage and into a low-conductance state by dropping the current below the holding current. During the high-conductance state, the holding current is guaranteed by a bias circuit directly connected to the anode of the trigger diode. The diode is switched from one bistable state to the other by transient voltages generated in an adjoining circuit. The transients are coupled to the trigger diode by a capacitor. Both the read and write operation are half-select operations so that a single memory cell may be selectively written to a "1" or to a "0" stable state. Readout is accomplished by half-select driving one coordinate and monitoring the drive line on the orthogonal coordinate.

7 Claims, 5 Drawing Figures

INVENTOR
A. M. PATEL
BY
ATTORNEY

RANDOM ACCESS SOLID-STATE MEMORY USING SCR'S

BACKGROUND OF THE INVENTION

This invention relates to a solid-state memory cell which may be used to build up a random-access memory array.

Present memory arrays are, usually, magnetic core memories or magnetic thin film memories. The advent of integrated circuits has raised the possibility of building solid-state memory arrays having an even higher storage density than a core memory.

One solid-state, bistable element, which could be used as a memory cell in a memory array, is a trigger diode. The trigger diode is a low-power silicon control rectifier without a gate electrode.

In the past, the trigger diode has been used as a memory element and also as a logic element. As a memory element, the trigger diode was switched between its two conduction states by a reactive circuit. A first pulse drove the diode into a high-conduction state and resulted in the buildup of charge on a capacitive circuit. A second pulse applied to the same input cooperated with the voltage built up on the capacitive circuit to bias the diode so that its current dropped below the holding current and, thereby, switched the diode back to a low-conduction state.

This successive pulse technique for switching a trigger diode cannot be utilized to make a memory array with trigger diodes. A memory array requires half-select operation and at least two drive lines into each memory cell. With drive lines arrayed in a two coordinate system and half drive applied over a single line in each coordinate, a single memory cell may be selectively switched without other cells along either half-driven coordinate. Because the successive pulse memory cell has only a single input drive line, it could not be used in a two coordinate memory array.

As a logic element, a trigger diode has been driven by two signals on two separate lines to switch the diode. In particular, the trigger diode has been used in a half adder logic circuit wherein two signals of equal amplitude are summed and applied to the trigger diode to switch the diode into a low-conduction state. When the two drive signals are removed, the diode reverts to its high-conduction state and does not store information.

Accordingly, the half-signal drive over two lines taught in the logic circuit has no applicability to use of a trigger diode as a memory cell. For switching a trigger diode in a memory cell application, there must be not only half-select drive, but also half-select drive which causes the memory cell to stay in one conduction state or the other. Furthermore, there must be additional biasing to assure that the diode, once it is in a given state, will stay in that the state. Thus, the half-select operation must be able to drive the diode first into one state and then into the second state so that both binary bits of information, "1" or "0", may be written into a memory cell.

Another function absent in the prior art trigger diode memory circuits is the half-select readout function. For a trigger diode memory cell to be utilized in a memory array, it must be possible to sense its conduction state without changing the state of the sensed memory cell or any other state along the same coordinates.

In summary, to utilize a trigger diode in a memory cell circuit, it is desirable that the circuit have the following characteristics, or functions: (1) half-select drive over at least two drive lines to switch the memory cell into either of two binary states; (2) steady state biasing of the diode to hold it in each stable state after it has been switched; (3) half-select drive to read out the present state of the memory cell. The prior art trigger diode circuits are not capable of the above functions.

It is an object of this invention to utilize the bistable characteristic of the trigger diode in a memory cell which has half-select drives to write either bistable state.

It is a further object of this invention to build a solid-state, random access memory array utilizing the trigger diode as the memory element and featuring half-select drive for the writing and the reading of information.

SUMMARY OF THE INVENTION

In accordance with the invention, the above objects are accomplished by biasing a trigger diode with a holding current bias network and switching the diode between conduction states with a transient signal generating circuit reactively coupled to the trigger diode. The transient signal-generating circuit is designed to that more than one drive signal is required to generate a transient large enough to switch the bistable state of the trigger diode.

The memory cell, formed by the diode, the biasing circuit and the transient signal-generating circuit, may be placed in a memory array. If a given coordinate drive line in the X direction of the array and a given coordinate drive line in the Y direction of the array are excited, only the memory cell connected to both coordinates will change its binary state. Other memory cells having only one coordinate drive line excited will not change their binary state.

To accomplish nondestructive readout, the transient signal generating circuit is driven by a drive signal over one of the coordinate drive lines. This drive signal is not sufficient to switch the bistable state of the memory cell, but the transient that it does create can be monitored on the orthogonal coordinate to detect the present conduction state of the memory cell. Accordingly, a single memory cell may be read out, or a plurality of memory cells may be read out by monitoring the coordinate drive lines orthogonal to the drive line on which the readout drive signal is applied.

The foregoing and other objects, features and advantages of the invention will be apparent from the following more particular description of a preferred embodiment of the invention as illustrated in the accompanying drawings.

DETAILED DESCRIPTION

Figure 1A:
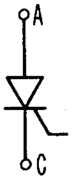
FIG. 1*a* shows the symbolic representation of a trigger diode or an ungated, silicon control rectifier.
Figure 1B:
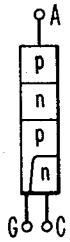
FIG. 1*b* shows the schematic representation of the PNPN-junctions in a trigger diode.

The trigger diode, or ungated, silicon control rectifier, is shown symbolically in FIG. 1*a*. This diode is a four-layer semiconductor device, as represented in FIG. 1*b*. When used as a trigger diode, the gate of the silicon control rectifier is not used.

Figure 2:
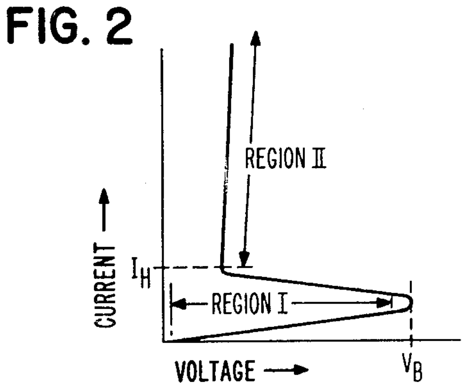
FIG. 2 shows the voltage current characteristic of the trigger diode.

In FIG. 2, the current voltage characteristic of the trigger diode is shown. When the trigger diode is in a low-conduction state, it is being operated in Region I of the current voltage (I-V) characteristic. When the diode is in the high-conduction state, it is being operated in Region II of the I-V characteristic. The diode may be biased so as to stay in Region I or Region II.

Assuming the diode is the Region I, the voltage across the diode will have to exceed the breakover voltage $V_B$ before the diode will switch into the high-conductance state (Region II). If the diode is in the high-conductance state, it will not return to the low-conductance state (Region I), unless the current through the diode goes below the holding current $I_H$. It is this bistable nature of the trigger diode which may be utilized to store binary information.

Figure 3:
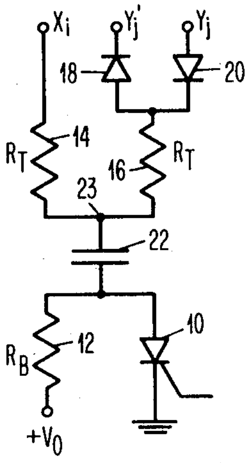
FIG. 3 shows a preferred embodiment of the memory cell.

The preferred embodiment of the memory cell using the trigger diode is shown in FIG. 3. Trigger diode 10 has its cathode grounded and its anode connected to a holding current bias circuit consisting of resistor 12 in voltage source $V_0$. The resistance of resistor 12 is defined as $R_B$.

To trigger the diode 10 between its two bistable states of conduction, a transient generating circuit is provided. The transient generating circuit consists of two parallel resistors 14 and 16 and diodes 18 and 20. The resistance of resistors 14 and 16 is substantially the same and is defined as resistance $R_T$. The diodes are connected to resistor 16 in parallel, but opposite to each other in direction.

Resistor 14 is connected to an X coordinate driver while resistor 16 is effectively connected to one of two Y coordinate drivers, depending upon the polarity of the signal applied to the coordinates. The polarity of the signal controls which diode, 18 or 20, will be conductive. The difference in polarity is utilized to distinguish between writing a "1" and writing a "0," or in this particular memory cell, between triggering the diode into a high-conductance state or a low-conductance state, respectively. Of course, the values "1" or "0" could be assigned to either conductance state.

The drive signals applied over the coordinate inputs $X_i$ and $Y_j$ or $Y_j'$ are pulse signals. These pulse signals will produce a transient voltage which will be coupled by capacitor 22 to the holding current bias circuit and to the anode of trigger diode 10. By selecting appropriate values for the resistors 12, 14, and 16, the voltage $V_o$, and the amplitude of the pulses applied over the coordinate line inputs, the diode 10 may be triggered into either of its two stable states of conduction.

To write a "1" in the memory cell of FIG. 3, the $X_i$ and the $Y_j$ line are excited with simultaneous positive voltage pulses of $V_i$ amplitude. This causes an increase, or rise in voltage at node 23. Capacitor 22, of course, passes this rising transient voltage to the anode of diode 10. The transient voltage coacts with resistor 12 and the bias voltage $V_o$ to produce a voltage pulse which exceeds the breakover voltage for the diode 10. Trigger diode 10 then switches into the high-conductance state (Region II of FIG. 2). The relationship between the voltage sources and the resistances to accomplish the triggering of diode 10 into high conduction, is as follows:

(1)
$$V_0+V_1\left(\frac{R_B}{R_B+\frac{R_T}{2}}\right)>V_B$$

The above relationship was derived by recognizing that the capacitor 22 only passes the transient voltages, and that the resistance of the diode 10, when in Region I (FIG. 2), is much higher than the resistance of resistor 12. If the diode is already in high-conductance state ("1" condition), the positive $V_i$ pulses do not cause the diode to change state. The current through the diode is driven higher, and there is no danger of the current falling below the holding current level $I_H$.

As previously pointed out, in half-select operation of a memory array, the signal on each coordinate line should not cause a change in the state of memory cells along that coordinate, except at the intersection of two excited coordinate lines. In FIG. 3, a half-select condition, when writing a "1" corresponds to a positive $V_i$ pulse applied to either $X_i$ or $Y_i$, but not both. If diode 10 is in the "0," or low-conductance state, a single $+V_i$ pulse on either $X_i$ or $Y_j$ will not switch the state of the diode so long as the following relationship is satisfied:

(2)
$$V_0+V_1\left(\frac{R_B}{R_B+R_T}\right)<V_B$$

If diode 10 is already in the high conductance state, a single $+V_i$ pulse on either $X_i$ or $Y_j$ will not switch the state of the diode. The current through the diode is driven higher, and there is no danger of the current falling below the holding current level $I_H$.

To write a "0", which is to switch the diode 10 from a high-conductance state to a low-conductance state, simultaneous negative voltage pulses of $V_2$ amplitude are applied to coordinates $X_i$ and $Y_j'$. The negative voltage pulse transient that appears at node 23 is passed to the anode of diode 10 by capacitor 22. This negative, transient, voltage pulse coacts with the current provided by the voltage source $V_o$ and resistor 12 to drop the current in diode 10 below the holding current level $I_H$. Diode 10 then switches to the low-conductance state (Region I of FIG. 2). The relationship between the voltage sources and the resistances to switch diode 10 into the low-conductance state is given, as follows:

(3)
$$\frac{V_0}{R_B}-\frac{V_2}{R_{T/2}}<I_H$$

This relationship was derived by recognizing that, in a high-conductance state, diode 10 is essentially a short circuit.

If diode 10 is already in the low-conductance state, then a negative $V_2$ pulse applied to either $X_i$ or $Y_j'$, or both $X_i$ and $Y_j'$, will not switch diode 10. The voltage across the diode 10 will be driven lower in either situation. There is no danger of a $V_2$ pulse causing the voltage across the diode to exceed $V_b$.

A half-select condition, when writing a "0," corresponds to a negative $V_2$ pulse applied to either $X_i$ or $Y_j'$, but not both. If diode 10 is in the "1," or high-conductance state, a single $-V_2$ pulse on either $X_i$ or $Y_j'$ will not switch the state of the diode so long as the following relationship is satisfied:

(4)
$$\frac{V_0}{R_B}-\frac{V_2}{R_T}>I_H$$

$V_0$, $V_1$, $V_2$, and $R_B$ and $R_T$ must be chosen to satisfy the inequality expressions (1), (2), (3), and (4). If the inequalities are satisfied, the memory cell in FIG. 3 can be the basic element in a memory array. Each cell can be driven into the "1" or "0" state without affecting other cells in the array.

To read out the contents of a memory cell, a single pulse of positive amplitude $V_1$ is applied to the X coordinate. This pulse will interact with the holding current bias network and the diode 10 to produce a pulse on the $Y_j'$ line will depend upon the conductance state of the diode 10. If diode 10 is in the high-conductance, or "1" state, capacitor 22 is essentially connected to ground. Most of the $V_1$ pulse goes through the large capacitor to ground. There is very little transient signal feed through to $Y_j'$.

If diode 10 is in the low-conductance, or "0" state, then capacitor 22 is effectively in series with $R_B$. The transient voltage across $R_B$ will be sensed at $Y_j'$. Therefore, when $V_1$ pulse is applied to $X_i$, little or no signal at $Y_j'$ indicates at "1," while a substantial signal at $Y_j'$ indicates a "0."

Figure 4:
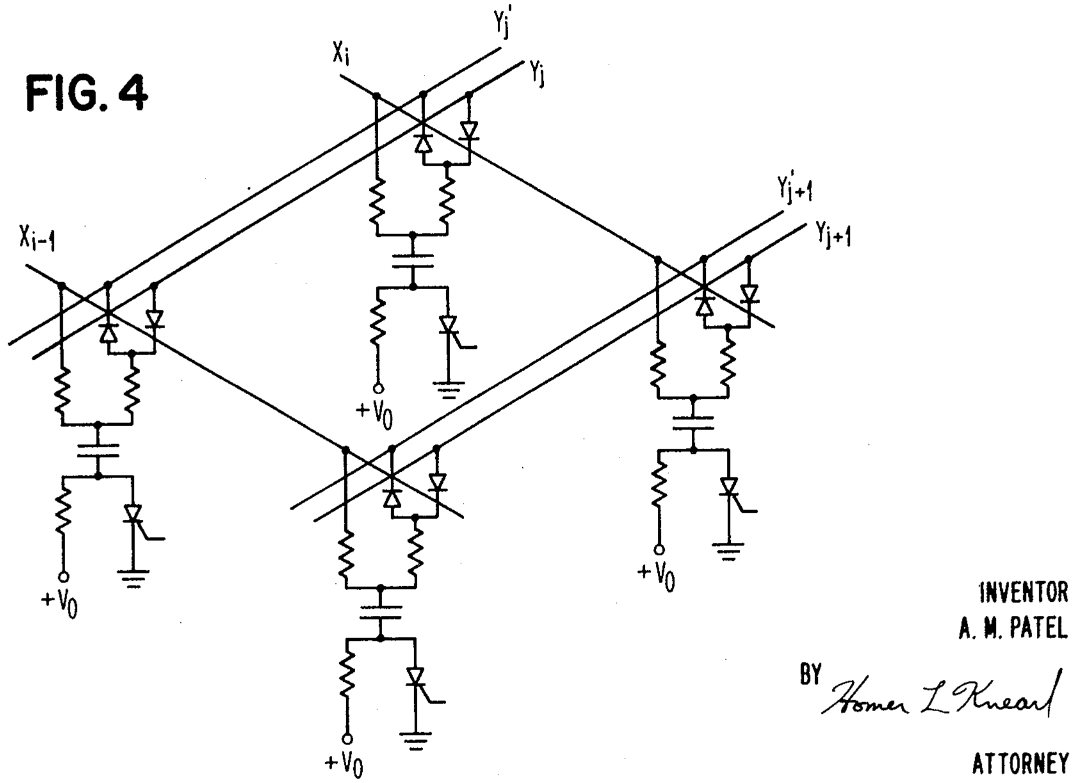
FIG. 4 shows the memory cell of FIG. 3 utilized in a section of a two-coordinate memory array.

Referring now to FIG. 4, an array of four memory cells is shown. It will be appreciated by one skilled in the art that the array could be of any dimension desired having many numerous cells on each coordinate line. A given memory cell may be written with a "1" or a "0," as described with reference to FIG. 3, by use of two half-select pulses. Readout is accomplished by a single half-select pulse supplied to the X coordinate line and monitoring all of the Y′ lines to readout an entire word from memory simultaneously. Of course, a single bit could be read out by monitoring a single $Y_j'$ line.

Other variations in the invention could be the formation of a three-dimensional array by stacking several of the two-dimensional arrays shown in FIG. 4, one on top of the other. In the third dimension, drive lines would have to be successively activated to control which memory plane was being written on.

In another variation of the invention, the $Y_j$ coordinate could be connected to the gate of the silicon control rectifier. In this configuration, a "1" would be written by increasing the current in the $Y_j$ coordinate and by applying a positive voltage pulse on the $X_i$ coordinate. Otherwise the configuration is unchanged, except that the diode 20, in FIG. 3, is no longer used, and the $Y_j$ coordinate is directly connected to the gate of the silicon control rectifier.

While the invention has been particularly shown and described with reference to a preferred embodiment thereof, it will be understood by those skilled in the art that various changes in form and details may be made therein without departing from the spirit and scope of the invention.

What is claimed is:

1. A half-select binary memory cell for storing binary data comprising:

a semiconductive device having two states of conductance with a negative resistance transition region between the two states of conductance so that if the device is operatively driven from one state of conductance into the negative resistance region, the device will switch to the other state of conductance;

means for biasing said semiconductive device with a bias signal, so that each state of conductance is a stable state of operation, the DC level of the bias signal being dependent upon the state of conductance of said semiconductive device;

means for generating a transient signal;

first input means for applying a first half-select drive signal to said generating means;

second input means for applying a second half-select drive signal to said generating means;

said generating means generating a transient signal whose amplitude is dependent upon the presence of the half-select drive signals, whereby the amplitude of the transient signal is largest when both of the half-select drive signals are applied to the generating means simultaneously;

means for reactively coupling the transient signal from said generating means to the semiconductive device, whereby the transient signal is superimposed on the bias signal from said biasing means so that the state of conductance of the semiconductive device is changed if the semiconductive device is biased into the negative resistance region when the largest transient signal is added to the DC level of the bias signal.

2. The half-select binary memory cell of claim 1, wherein said second input means, when not applying a half-select drive signal to said generating means, provides a sense conduit over which signals indicative of the conductive state of said semiconductive device will pass when said first input means applies a half-select drive signal to said generating means.

3. The half-select binary memory cell of claim 1, wherein said generating means in cooperation with said biasing means makes up a voltage divider network for the half-select signals AC coupled between said generating means and said biasing means, so that a transient signal is superimposed on the bias signal.

4. A solid-state random access memory array made up of a plurality of the memory cells of claim 1, wherein said first input means of the memory cells are connected to drive lines associated with one coordinate of the array, and said second input means of said memory cells are connected to drive lines associated with the other coordinate of the memory array.

5. In a half-select binary memory cell for storing binary data in a semiconductive device having two states of conductance, whereby the device stores a binary bit by being in one of the two possible states of conductance, improved means for writing binary data into the memory cell comprising:

means for biasing said semiconductive device so that each state of conductance is a stable state of operation;

means for generating a transient signal, said generating means being AC coupled to said biasing means;

a first input means and a second input means, both means for energizing said generating means with half-select input signals, the polarity of the input signals being indicative of the binary data to be stored in the memory cell;

said generating means responsive to said first and second input means, whereby the amplitude of the transient signal generated by said generating means is dependent upon the simultaneous presence of a half-select input signal on each input means, so that the amplitude of the transient signal when AC coupled to the bias signal will cause said semiconductive device to change its state of conductance if the semiconductive device is not already in the state indicated by the polarity of the half-select input signals.

6. The half-select binary memory cell of claim 5, wherein said second input means, when not energizing said generating means, provides a sense conduit over which signals indicative of the conductive state of said semiconductive device will pass when said first input means energizes said generating means.

7. A solid-state random access memory array made up of a plurality of the memory cells of claim 5, wherein said first input means of the memory cells are connected to drive lines associated with one coordinate of the array, and said second input means of said memory cells are connected to drive lines associated with the other coordinate of the memory array.

* * * * *